(12) United States Patent
Guina

(10) Patent No.: US 9,266,410 B2
(45) Date of Patent: Feb. 23, 2016

(54) PORTABLE SUN VISOR WITH A PLURALITY OF ATTACHMENT MEMBERS

(71) Applicant: Duane Guina, Wynyard (CA)

(72) Inventor: Duane Guina, Wynyard (CA)

(*) Notice: Subject to any disclaimer, the term of this patent is extended or adjusted under 35 U.S.C. 154(b) by 0 days.

(21) Appl. No.: 14/336,714

(22) Filed: Jul. 21, 2014

(65) Prior Publication Data

US 2015/0047798 A1 Feb. 19, 2015

Related U.S. Application Data

(60) Provisional application No. 61/867,310, filed on Aug. 19, 2013.

(51) Int. Cl.
*B60J 3/02* (2006.01)

(52) U.S. Cl.
CPC .......................................... *B60J 3/02* (2013.01)

(58) Field of Classification Search
IPC ........ B60J 3/02,3/0221, 3/0226, 3/023, 3/0247, B60J 3/0286
See application file for complete search history.

(56) References Cited

U.S. PATENT DOCUMENTS

| 1,576,094 | A | * | 3/1926 | Culbertson | 248/292.13 |
|---|---|---|---|---|---|
| 1,829,924 | A | * | 11/1931 | Evertts | 248/205.5 |
| 4,560,251 | A | * | 12/1985 | Murjahn | 359/608 |
| 4,921,296 | A | * | 5/1990 | Gruber | 296/97.2 |
| D308,355 | S | | 6/1990 | Spoto | |
| 5,002,327 | A | * | 3/1991 | Bickford | 296/97.7 |
| 5,022,701 | A | * | 6/1991 | Thompson, II | 296/152 |
| 5,033,528 | A | | 7/1991 | Volcani | |
| 5,333,665 | A | * | 8/1994 | Safar | 160/84.05 |
| 5,641,191 | A | * | 6/1997 | Jia | 296/97.6 |
| 6,086,132 | A | * | 7/2000 | Larson et al. | 296/97.6 |
| 6,981,733 | B1 | | 1/2006 | Driscoll | |
| 2004/0217621 | A1 | * | 11/2004 | McCoy | 296/97.6 |
| 2011/0042995 | A1 | | 2/2011 | Benites | |
| 2011/0156435 | A1 | | 6/2011 | Carter | |
| 2012/0292941 | A1 | | 11/2012 | Bills | |

FOREIGN PATENT DOCUMENTS

GB 2216082 10/1989

* cited by examiner

*Primary Examiner* — David Purol
(74) *Attorney, Agent, or Firm* — Kyle R. Satterthwaite; Ryan W. Dupris; Ade & Company, Inc.

(57) ABSTRACT

Described is a portable sun visor comprising a sun shielding member, an adjustable support arm, and a mounting member, said mounting member comprising a plurality of different attachment members for fastening the sun visor to an object. One of the attachment members is a clamp featuring a stationary first jaw that is defined by a handle portion of the mounting member near a distal end of the handle that lies opposite the support arm, and a movable second jaw pivotally connected to the handle portion at an intermediate location thereon. The mouth of the clamp points toward the distal end of the handle portion, where a blade extends parallel to the handle on a side thereof opposite the clamp. The blade is insertable into a vehicle door on the inside surface of a window to hold the sun shielding member in position at that window.

10 Claims, 3 Drawing Sheets

PORTABLE SUN VISOR WITH A PLURALITY OF ATTACHMENT MEMBERS

CROSS REFERENCE TO RELATED APPLICATIONS

This application claims benefit under 35 U.S.C. 119(e) of Provisional Application Ser. No. 61/867,310, filed Aug. 19, 2013.

FIELD

This disclosure relates to the field of portable sun visors and more specifically to the field of adjustable sun visors suitable for use in an automotive vehicle.

BACKGROUND

Portable and adjustable sun visors are suitable for use in an automotive vehicle or attached to a personal object such as a chair, a child's car seat, or a stroller. These visors are intended to provide sun protection to the user in settings where sun protection might not otherwise be readily available. Portable and adjustable sun visors are particularly suited to use in a vehicle to provide sun protection in areas that are not shaded by the built-in sun visor.

Portable sun shades or visors are known, such as those described in GB 2216082, U.S. Pat. No. 5,033,528, U.S. Pat. No. 6,981,733, US 2011/0156435, US 2012/0292941, US 2011/0042995, and U.S. D308355. However, there remains a desire for a portable sun shade that can be easily attached to various types of supports and that can be readily positioned and repositioned within a vehicle to meet the needs of a driver.

SUMMARY

According to one aspect of the present invention, there is provided a portable sun visor comprising:
  a sun shielding member;
  an adjustable support arm having a first end and an opposite second end; and
  a mounting member comprising a plurality of different attachment members for fastening the sun visor to an object,
  wherein the sun shielding member is connected or connectable to the first end of the support arm and the multifunctional mounting member is connected or connectable to the second end of the support arm.

In an embodiment, the plurality of attachment members comprises a clamp.

Preferably the clamp is disposed at an intermediate location on the mounting member.

Preferably the clamp comprises:
  a stationary first jaw defined by a handle portion of the mounting member at a location proximate a distal end of said handle portion that resides opposite the adjustable support; and
  a movable second jaw pivotally connected to the handle portion at an intermediate location thereon to operably define an openable and closeable mouth between the first and second jaws.

Preferably the mouth of the clamp faces toward the distal end of the handle portion.

In a further embodiment, the plurality of attachment members comprises a mounting blade.

Preferably the mounting blade is attached to the distal end of the handle portion.

Preferably the mounting blade resides at a different side of the handle portion than the second movable jaw of the clamp, for example at a side of the handle portion thereopposite.

In an embodiment, the mounting blade comprises a flared blade having a first end joined to the mounting member and an opposite second end free to engage a vehicle window by insertion of the second end between the window and a seal or weatherstripping of the vehicle window, said first end of the mounting member being narrower in width than the second end of the mounting member.

In an additional embodiment, the mounting member has a first end and an opposite second end, and wherein the first end of the mounting member is joined to the second end of the support arm and the second end of the mounting member is joined to the mounting blade, whereby the mounting blade is disposed at an end of the mounting member opposite a connection of said mounting member to the adjustable support arm.

In an embodiment, the plurality of attachment members comprises a suction cup.

In an embodiment, the adjustable support arm is a flexible arm.

In another embodiment, the adjustable support arm is joined to the multifunctional mounting member by a ball and socket.

In an embodiment, the sun shielding member comprises a sun blocking material.

In yet another embodiment, the sun shielding member comprises a sun filtering material.

In a further embodiment, the sun shielding member is releasably joined to the support arm and/or the support arm is releasably joined to the mounting member, allowing the sun visor to be at least partially disassembled by a user.

According to another aspect of the invention, there is provided a portable sun visor comprising:
  a sun shielding member;
  an adjustable support arm having a first end connected or connectable to the sun shielding member, and a second end opposite the first end;
  a handle having a proximal end connected or connectable to the second end of the adjustable support arm, and a distal end opposite the first end; and
  a clamp for fastening the sun visor to an object;
  wherein the clamp comprises:
    a stationary first jaw defined by the handle at a location proximate the distal end thereof; and
    a movable second jaw pivotally connected to the handle at an intermediate location between the proximate and distal ends thereof to operably define an openable and closeable mouth between the first and second jaws.

According to another aspect of the invention, there is provide a portable sun visor comprising:
  a sun shielding member;
  an adjustable support arm having a first end connected to the sun shielding member, and a second end opposite the first end;
  a handle comprising a shaft having a proximal end connected to the second end of the adjustable support arm, and a distal end opposite the first end; and
  a clamp for fastening the sun visor to an object;
  wherein the clamp comprises:
    a stationary first jaw comprising a curved depression in a first side of the shaft of the handle at a location proximate the distal end thereof; and
    a movable second jaw comprising a pivotal end pivotally connected to the handle at the first side of the shaft at an intermediate location residing between the proximate end of the shaft and the curved depression therein, a free end disposed opposite the pivotal end, and a concave interior facing toward the curved depression in the shaft of the handle, the free end of the movable second jaw being movable into and out of a closed position against the shaft of the handle at an area proximate the distal end thereof by pivoting of the movable second jaw about the pivotal end thereof to thereby operably define an openable and closeable mouth between the first and second jaws; and a planar blade attached to and forming an extension of the shaft at the distal end thereof to enable insertion of the planar blade into a vehicle door window space to support the sun shade on a vehicle door, the planar blade being situated at a second side of the shaft that is opposite to the first side so as to prevent the shaft and the clamp from interfering with said insertion of said planar blade into said window space.

In one embodiment, there is provided a suction cup attached to the shaft of the handle and residing at the second side thereof at a location between the proximate and distal ends of said shaft.

DESCRIPTION

Figure 1:
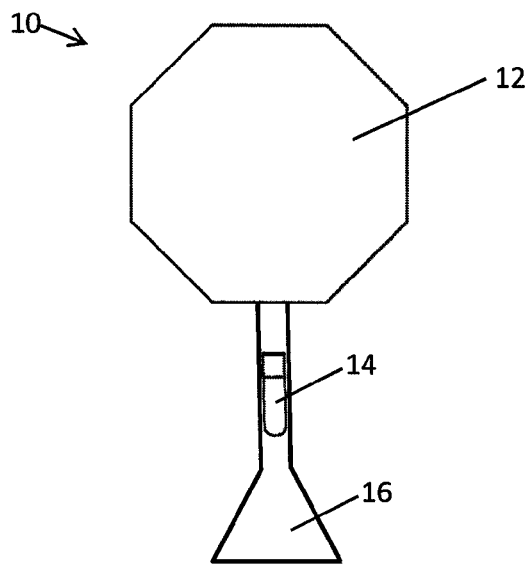
FIG. 1 depicts a front view of an embodiment of a sun visor of the disclosure.

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense. Further, where considered appropriate, reference numerals may be repeated among the figures to indicate corresponding or analogous elements.

Provided generally is a sun visor comprising a sun shielding member joined to an adjustable support arm, said support arm further joined to a multifunctional mounting member comprising a plurality of different attachment members. In an embodiment, the plurality of attachment members comprises a clamp and a mounting blade. In an additional embodiment, the mounting member may further comprise a suction cup, allowing the sun visor to be mounted directly to a window surface. Additional attachment members may also be employed, such as a releasable adhesive patch or a hook and loop closure. The clamp allows the sun visor to be mounted to a support structure or object by being clamped to the support structure or object, while the mounting blade allows the sun visor to be mounted against a window of an automotive vehicle by insertion of the mounting blade between the inner face of the window and the weatherstripping or seal at an outer edge portion of said window.

The sun visor is intended for use to shade the eyes and/or face of a user, or to filter the light that reaches the eyes and/or face of a user. The sun visor may further be employed to shade an object being viewed by a user, such as a book or visual display. The sun visor is particularly suited for use in an automotive vehicle to protect the eyes of a driver from the glare of the sun and to thereby increase visibility for the driver. However, the sun visor could also be used to shield a passenger from the sun. When not in use in an automotive vehicle, the sun visor could also be fastened to an object such as a chair, car seat, or stroller to shield an individual sitting in said chair, car seat, or stroller from the sun. The sun visor is further suitable for use to provide shade to the pages of an item being viewed by a user such as a book or a visual display, such as a tablet screen, laptop screen, e-book reader, or smartphone screen. In this instance, the sun visor could be fastened directly to the object to be shaded, for example by fastening to the cover of a book, or the sun visor could be fastened to an adjacent object such as a chair or table. The sun visor is intended to be portable and readily positionable to allow for simple and readily adjustable positioning of the sun visor, relative to the angle of the sun, to meet the needs of the user.

Figure 2:
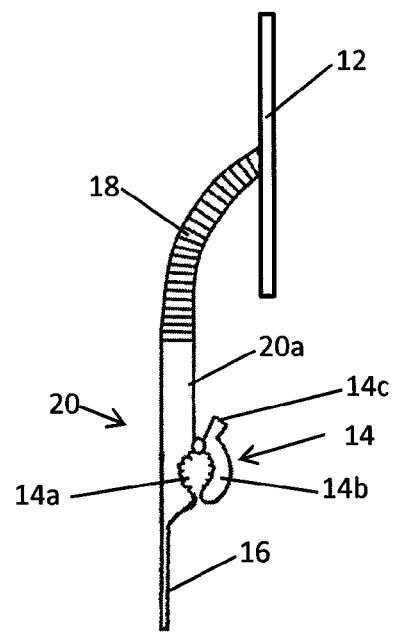
FIG. 2 depicts a side view of the sun visor.
Figure 6:
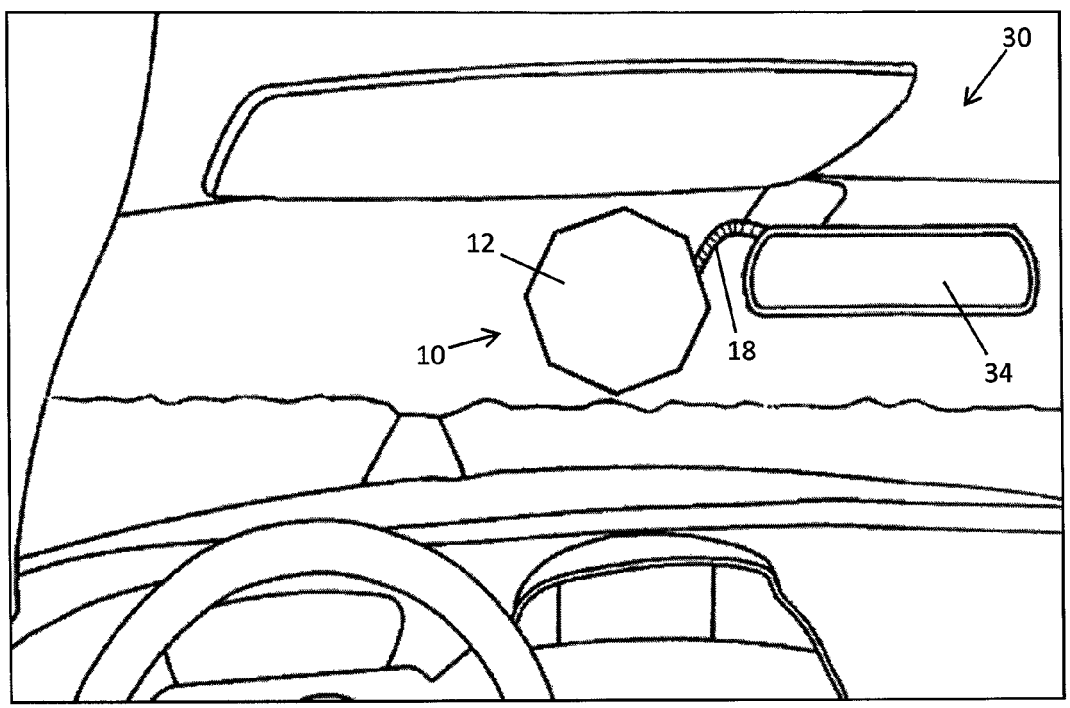
FIG. 6 depicts a front view of a sun visor mounted within an automotive vehicle, wherein the sun visor is fastened to the vehicle by clamping of the clamp to the mounting arm of the rearview mirror of the vehicle.

A first embodiment of the sun visor 10 is depicted in FIGS. 1 and 2. The sun visor comprises a sun shielding member 12 joined to a first end of an adjustable support arm 18. In the depicted embodiment, the support arm 18 is flexible and capable of bending with a 360 degree range of movement, allowing the sun shielding member 12 to be positioned between the sun and the user or object to be shaded. The flexible support arm 18 is also shape retaining, such that the support arm 18, once bent into any particular shape, retains its shape until repositioned by a user. The opposite end of the support arm 18 is joined to a mounting member 20 comprising a clamp 14 and a mounting blade 16. In an embodiment, the jaws of clamp 14 may be of a suitable size and configuration to securely grasp the mounting arm of a rearview mirror 34 within an automotive vehicle 30. An example of the sun visor mounted within a vehicle 30 by clamping the clamp 14 to the mounting arm of a rearview mirror 34 is depicted in FIG. 6. In an embodiment, the jaws of clamp 14 may comprise a resilient, non-slip material, such as rubber, to inhibit movement of the clamp 14 relative to a support once the sun visor 10 has been clamped to the support. In a further embodiment, the jaws of the clamp 14 may be of a suitable shape and size to securely grasp an object such as a chair, child's car seat, stroller, book, or computing device.

Figure 5:
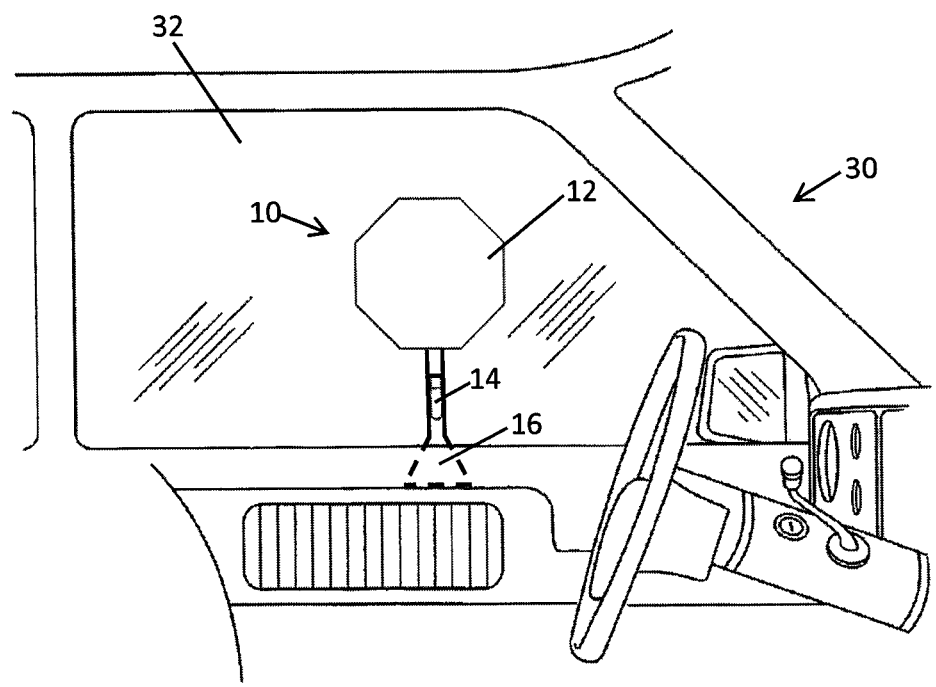
FIG. 5 depicts a front view of a sun visor of the disclosure mounted within an automotive vehicle, wherein the sun visor is fastened to the vehicle by insertion of the mounting blade between an inner surface of a window and the weatherstripping of the window.

The mounting blade 16 is substantially planar and is of a suitable thickness to allow the mounting blade 16 to be inserted along the interior face of a vehicle window 32 between the inner face of the window 32 and the weatherstripping or seal of said window 32, for example as depicted in FIG. 5. In the depicted embodiments, the mounting blade 16 is a flared blade that is wider at the end of the blade 16 that is to be inserted against the window 32 and narrower at the end of the blade that is joined to the mounting member 20. However, the blade 16 may be of any suitable shape as will readily be understood to one skilled in the art. For example, the blade 16 could be rectangular or oblong. The length of the blade 16 should be sufficient to allow the blade 16 to be inserted against a window 32 to a depth sufficient to maintain the sun visor 10 in a substantially fixed position, without appreciable wobbling or falling away from the window 32 by the sun visor 10. The clamp may be any suitable type of clamp as will readily be understood by one skilled in the art.

In the illustrated embodiments, the mounting member features a handle portion in the form of a rigid shaft 20a that extends linearly from the joint or connection with the support arm 18, with the blade 16 being a parallel extension of the shaft 20a from the distal end thereof that lies opposite the support arm 18. The shaft 20a features an integrally-defined, stationary clamp jaw 14a in the form of a curved depression or recess that is formed in one side of the shaft 20a near the distal end thereof and features serrated teeth, a resilient non-slip lining, other grip-enhancing feature, or any combination thereof. A movable second jaw 14b of the clamp is pivotally attached to the shaft 20a at a location between the curved depression of the shaft portion and the proximal end thereof that is connected to the support arm 18. The pivot axis of the second jaw 14b lies perpendicular to the shaft 20a, whereby pivoting of the jaw 14b about the pivot axis in opposing directions acts to open and close a mouth of the clamp that points toward the distal end of the shaft 20a and the blade 16 supported thereat.

The illustrated second jaw 14b features an arc-shaped portion whose concave interior defines a toothed and/or lined recess similar or identical to that of the integral first jaw on the shaft. The arc-shaped portion features the pivotal connection to the shaft 20a at one end, with the opposite free end of the arc-shaped portion being situated at the mouth of the clamp. The free end of the arc-shaped portion thus abuts against the shaft 20a near the distal end thereof when the mouth of the clamp is closed. The second clamp jaw 14b is spring biased into the closed position so as to automatically close around a rearview mirror mounting arm 34 or other object. A stub or tab projects radially outward from the pivotally connected end of the second jaw so as to extend obliquely away from the shaft toward the proximal end thereof when the clamp jaws are closed. This forms a thumb-lever 14c that is squeezable toward the shaft to temporarily open the clamp against the bias of the spring-loaded second jaw 14b.

The plane of the flat blade 16 is parallel to the longitudinal axis of the shaft and to the pivot axis of the clamp. This plane of the blade is located at side of the shaft opposite that at which the first clamp jaw is integrally defined, whereby the shaft and clamp do not interfere with insertion of the blade into the window space of the vehicle door.

Figure 3:
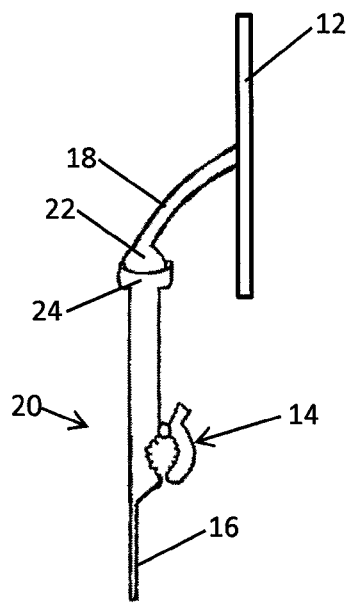
FIG. 3 depicts a side view of an alternate embodiment of the sun visor.

A second embodiment of the sun visor is depicted in FIG. 3. In this embodiment, the adjustable support arm 18 is joined to the mounting member 20 by a ball 22 and socket 24 assembly. In the illustrated embodiment, the socket 24 is joined to the mounting member 20, though in a non-illustrated embodiment the socket 24 could be joined to the adjustable support arm 18 with the ball 22 joined to the mounting member 20. The socket 24 may be fastened to the multifunctional mounting member 20 or support arm 18, or the socket 24 may be integral with the multifunctional mounting member 20 or support arm 18. The ball 22 is rotatable within the socket 24, allowing the support arm 18 to be moved to position the sun shielding member 12 between the sun and a user or object to be shielded. In an embodiment, the ball 22 and socket 24 assembly comprises a releasable ball joint, such as a magnetic ball joint, while in other embodiments, the ball 22 may be permanently maintained within the socket 24.

In a further embodiment, the adjustable support arm 18 may be an extendable arm, allowing the support arm 18 to be extended or retracted as needed to position the sun shielding member 12 at a desired position, which may be proximal to the mounting member 20 or more distant from the mounting member 20. For example, the support arm 18 may comprise an extendible arm such as a telescopic arm, a foldable arm comprising pivotally joined sections, or an accordion arm. In an embodiment, the full length of the support arm 18 may be extendible while in another embodiment at least a portion of the support arm 18 is extendible. The support arm 18 may comprise both extendible and non-extendible portions as desired.

Figure 4:
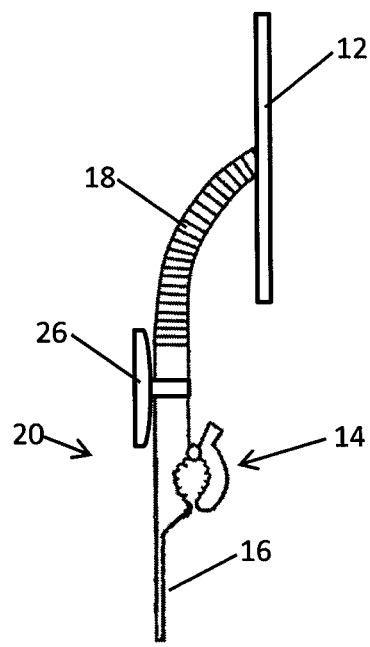
FIG. 4 depicts a side view of another embodiment of the sun visor.

In another embodiment, depicted in FIG. 4, the sun visor 10 may further comprise a suction cup 26 joined to the mounting member 20, allowing the sun visor 10 to be mounted to a substantially smooth and planar surface, such as the face of a window 32. In an embodiment, the suction cup 26 may positionable along the length of the mounting member 20 and/or the suction cup 26 may be rotatable around the longitudinal axis of the mounting member 20 to allow a user to adjust the positioning of the suction cup 26 to allow for optimized placement of the sun visor 10 once mounted. In another embodiment, the position of the suction cup 26 may be fixed relative to the mounting member 20.

The sun shielding member 12 comprises a sheet or disk of sun blocking or sun filtering material that is sufficiently rigid to maintain its shape without drooping. The size and shape of the sun shielding member 12 may be selected as desired, but the area of the face of the sun shielding member 12 should be sufficient to provide shade or filtered light to at least the eyes of a user. As used herein, the term sun blocking material refers to a material that blocks at least a substantial portion of the visible light spectrum and provides shade from the sun. Examples of suitable sun blocking materials include but are not limited to opaque materials such as plastic and metal. As used herein, the term sun filtering material describes a material that is transparent or semi-transparent; allowing some degree of visibility through the sun shielding member, while filtering out a portion of the UV and/or visible light spectrum. An example of a suitable sun filtering material is tinted plastic. In another embodiment, the sun shielding member 12 may comprise an opaque sun blocking material comprising a plurality of perforations to allow limited light transmission through the sun shielding member 12.

In an embodiment, the sun shielding member 12 blocks or filters a portion of the visible light spectrum to provide visual relief from sun glare. In a further embodiment, the sun shielding member 12 comprises a light and thin sheet material to minimize the weight of the sun shielding member 12. In yet another embodiment, the sun shielding member 12 comprises a UV-resistant material. In a still further embodiment, the sun shielding member 12 comprises an impact-resistant and/or shatterproof material.

In an embodiment, the multifunctional mounting member 20, support arm 18, and/or sun shielding member 12 may comprise a bio-based polymer derived from a renewable biomass source, such as vegetable oil or starch. In a further embodiment, the multifunctional mounting member 20, support arm 18, and/or sun shielding member 12 may comprise a bio-based polymer that is biodegradable.

In an embodiment, two of more of the major components of the sun visor: i.e. the mounting member 20, the adjustable arm 18, and the sun shielding member 12, may be releasably joined to one another; allowing the sun visor to be disassembled for shipping or storage and assembled for use. In an embodiment, the mounting member 20 may be detachable from the adjustable arm 18 and/or the sun shielding member 12 may be detachable from the adjustable arm 18. The releasably joined components may be joined by any suitable releasable fastener, as will readily be understood to one skilled in the art. For example, the components may be joined by a threaded joint, an interference fit joint, a magnetic joint, and/or a ball detent.

In the illustrated embodiments, the adjustable support arm 18 is joined to a face of the sun shielding member 12, however in other embodiments the adjustable support arm 18 may be joined to at least one side edge or side edge portion of the sun shielding member 12.

Numerous specific details are set forth herein in order to provide a thorough understanding of the exemplary embodiments described herein. However, it will be understood by those of ordinary skill in the art that these embodiments may be practiced without these specific details. In other instances, well-known methods, procedures and components have not been described in detail so as not to obscure the description of the embodiments.

Further, while the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting. It will be understood by persons skilled in the art that other variants and modifications may be made without departing from the scope of the invention as defined in the appended claims.

What is claimed is:

1. A portable sun visor comprising:
   a sun shielding member;
   an adjustable support arm having a first end connected to the sun shielding member, and a second end opposite the first end;
   a handle comprising a shaft having a proximal end connected to the second end of the adjustable support arm, and a distal end opposite the proximal end; and
   a clamp for fastening the sun visor to an object, said clamp comprising;
      a stationary first jaw comprising a curved depression in a first side of the shaft of the handle at a location proximate the distal end thereof; and
      a movable second jaw comprising a pivotal end pivotally connected to the handle at the first side of the shaft at an intermediate location residing between the proximate end of the shaft and the curved depression therein, a free end disposed opposite the pivotal end, and a concave interior facing toward the curved depression in the shaft of the handle, the free end of the movable second jaw being movable into and out of a closed position against the shaft of the handle at an area proximate the distal end thereof by pivoting of the movable second jaw about the pivotal end thereof to thereby operably define an openable and closeable mouth between the first and second jaws; and
   a planar blade attached to and forming an extension of the shaft at the distal end thereof to enable insertion of the planar blade into a window space of a vehicle door to support the sun shade on said vehicle door, the planar blade being situated at a second side of the shaft that is opposite to the first side so as to prevent the shaft and the clamp from interfering with said insertion of said planar blade into said window space.

2. The portable sun visor of claim 1 wherein the stationary first jaw and the movable second jaw comprise teeth at the curved depression of the stationary first jaw and concave interior of the movable second jaw.

3. The portable sun visor of claim 1, wherein the mounting blade comprises a flared blade having a first end joined to the shaft and an opposite second end free to engage said window space of the vehicle door by insertion of the second end between a window of said vehicle door and a weatherstripping seal of the vehicle door, said first end of the mounting member being narrower in width than the second end of the mounting member.

4. The portable sun visor of claim 1, further comprising a suction cup attached to the shaft of the handle and residing at the second side thereof at a location between the proximate and distal ends of said shaft.

5. The portable sun visor of claim 1, wherein the adjustable support arm is a flexible arm.

6. The portable sun visor of claim 1, wherein the adjustable support arm is joined to the shaft of the handle by a ball and socket joint.

7. The portable sun visor of claim 1, wherein the sun shielding member comprises a sun blocking material.

8. The portable sun visor of claim 1, wherein the sun shielding member comprises a sun filtering material.

9. The portable sun visor of claim 1, wherein the sun shielding member is releasably joined to the support arm, thereby allowing the sun visor to be at least partially disassembled by a user.

10. The portable sun visor of claim 1, wherein the support arm is releasably joined to the handle, thereby allowing the sun visor to be at least partially disassembled by a user.

\* \* \* \* \*